United States Patent
Yamamoto

(10) Patent No.: US 9,505,129 B2
(45) Date of Patent: Nov. 29, 2016

(54) ROBOT CONTROL DEVICE FOR STOPPING ROBOT BY DETECTING CONTACT FORCE WITH PERSON

(71) Applicant: FANUC Corporation, Yamanashi (JP)

(72) Inventor: Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/943,608

(22) Filed: Nov. 17, 2015

(65) Prior Publication Data
US 2016/0176052 A1 Jun. 23, 2016

(30) Foreign Application Priority Data
Dec. 22, 2014 (JP) .................. 2014-259285

(51) Int. Cl.
*G05B 19/04* (2006.01)
*B25J 9/16* (2006.01)

(52) U.S. Cl.
CPC ............. *B25J 9/1676* (2013.01); *Y10S 901/02* (2013.01); *Y10S 901/46* (2013.01); *Y10S 901/49* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0240307 A1* | 10/2005 | Kuroki | .................... | B25J 13/085 700/245 |
| 2009/0312867 A1* | 12/2009 | Hasegawa | ............ | B62D 57/032 700/245 |
| 2010/0087955 A1* | 4/2010 | Tsusaka | ................. | B25J 9/0003 700/245 |
| 2010/0152896 A1* | 6/2010 | Komatsu | ................ | B25J 9/0003 700/258 |
| 2011/0015787 A1* | 1/2011 | Tsusaka | .................. | B25J 9/0003 700/264 |
| 2012/0253516 A1* | 10/2012 | Iida | ......................... | B25J 9/1669 700/258 |
| 2013/0061695 A1* | 3/2013 | Sato | ........................ | B25J 13/085 73/865 |
| 2014/0107843 A1* | 4/2014 | Okazaki | ................. | B25J 13/085 700/260 |
| 2014/0222207 A1* | 8/2014 | Bowling | ................. | A61B 34/32 700/261 |
| 2015/0027862 A1* | 1/2015 | Takeuchi | ................. | B25J 19/06 200/47 |
| 2016/0089211 A1* | 3/2016 | Bowling | ................. | A61B 19/22 606/130 |
| 2016/0176052 A1* | 6/2016 | Yamamoto | ............. | B25J 9/1676 700/255 |

FOREIGN PATENT DOCUMENTS

| | | |
|---|---|---|
| JP | 63-127888 A | 5/1988 |
| JP | 2006-021287 A | 1/2006 |
| JP | 2009-66696 A | 4/2009 |
| JP | 2009-208170 A | 9/2009 |
| JP | 2009-297853 A | 12/2009 |
| JP | 2012-86313 A | 5/2012 |
| JP | 2013-43232 A | 3/2013 |

\* cited by examiner

*Primary Examiner* — Jonathan L Sample
(74) *Attorney, Agent, or Firm* — Hauptman Ham, LLP

(57) ABSTRACT

A robot control device comprises a mass parameter setting unit which sets a mass parameter, and a stop command unit which sends a stop command of a robot. A first upper limit value regarding external force and a second upper limit value smaller than the first upper limit value have been set. The stop command unit stops the robot when estimated external force exceeds the first upper limit value. Furthermore, the stop command unit makes the robot to be in a stop state when an average value of the external force exceeds the second upper limit value.

5 Claims, 6 Drawing Sheets

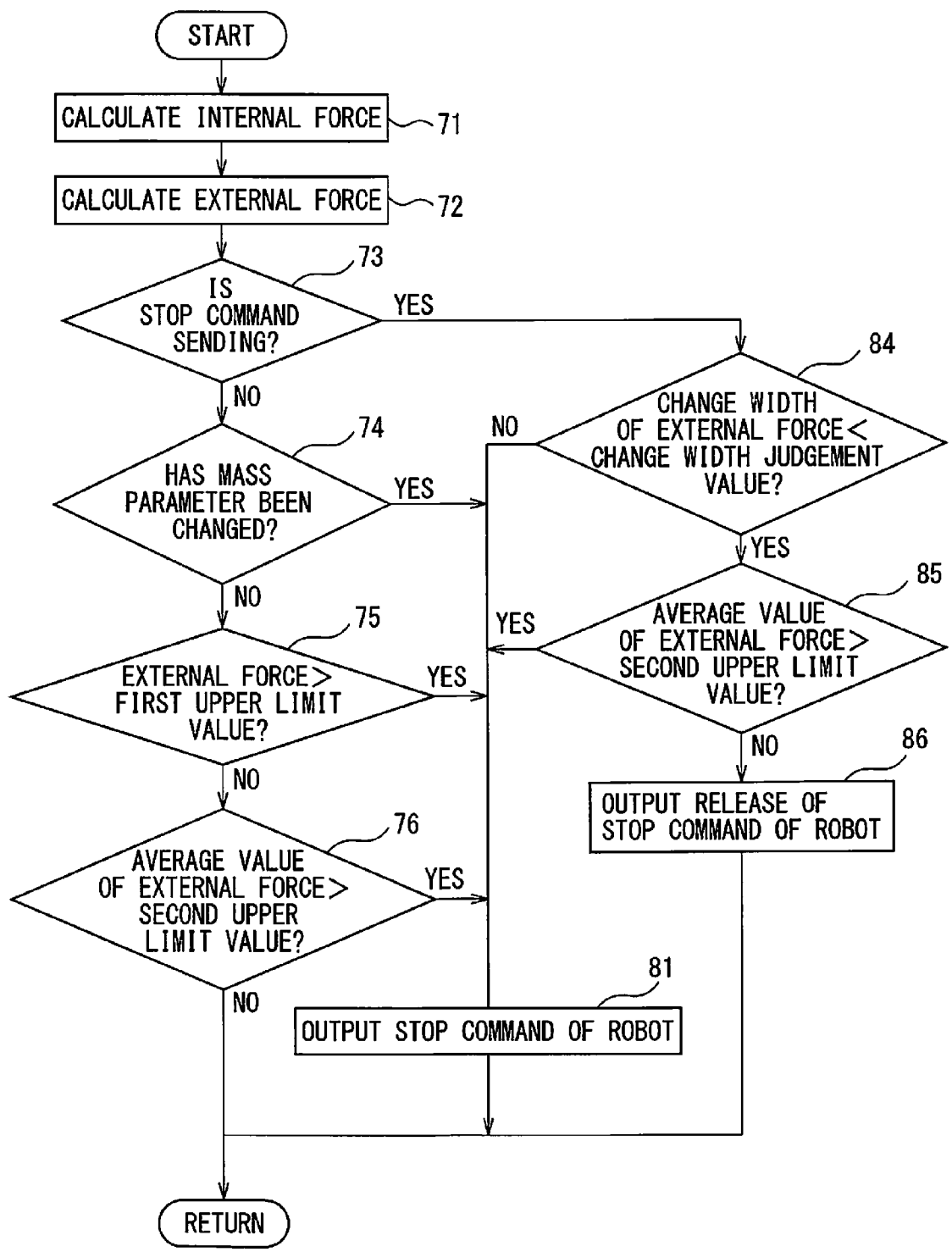

ROBOT CONTROL DEVICE FOR STOPPING ROBOT BY DETECTING CONTACT FORCE WITH PERSON

RELATED APPLICATIONS

The present application claims priority to Japanese Application Number 2014-259285, filed Dec. 22, 2014, the disclosure of which is hereby incorporated by reference herein in its entirety.

BACKGROUND OF THE INVENTION

1. Field of the Invention

The present invention relates to a robot control device which controls a robot.

2. Description of the Related Art

There is a case in which a robot receives force or torque (hereinafter, referred to as "external force") from an exterior during a period in which the robot operates. For example, there is a case in which the robot makes contact with a peripheral device or a worker makes contact with the robot. In such a case, it has been known that the robot stops by detecting the external force or performs an avoidance operation for avoiding an object.

Japanese Laid-open Patent Publication No. 2006-21287 discloses a contact force detection device in which a force detector is arranged on a robot base of a root part of a robot arm to detect force applied to the robot arm. In this publication, it is disclosed that a control device subtracts internal force by the operation of the robot arm from the force applied to the robot arm, thereby calculating contact force applied to the robot arm. Furthermore, in this publication, it is disclosed that an operation for reducing the contact force of the robot arm is performed.

In the robot control device disclosed in Japanese Laid-open Patent Publication No. 2006-21287, the internal force generated by the operation of the robot is calculated and is subtracted from entire external force detected by the force detector, so that contact force from an exterior with respect to the robot is calculated. When the contact force applied to the robot is calculated, it is necessary to correctly set the mass of a workpiece grasped by the robot in addition to the mass of the robot.

The mass of the workpiece can be set in the control device in advance. However, there is a case in which the grasped workpiece falls during the period in which the robot operates. Furthermore, there is a case in which the mass of the workpiece is not correctly set by an error of a worker. Furthermore, there is a case in which the workpiece grasped by the robot is different from a desired workpiece. When the mass of a workpiece used in calculation is different from the mass of a workpiece actually grasped, there occurs a problem that it is not possible to correctly estimate the internal force generated by the operation of the robot. Furthermore, there occurs a problem that it is not possible to correctly calculate contact force when the robot has been contacted. Therefore, although original external force for stop is applied to the robot, the robot may not stop.

SUMMARY OF INVENTION

A robot control device of the present invention is a robot control device which controls a robot including a force detector for detecting at least one of force and torque applied to the robot and a state detector for detecting a position and a posture of the robot, and includes a mass parameter setting unit which sets a mass parameter including mass of the robot and mass of a workpiece, and a stop command unit which sends a command for making the robot to be in a stop state. The stop command unit includes an internal force estimation unit which estimates internal force generated by an operation of the robot on a basis of the position and the posture of the robot detected by the state detector and the mass parameter, and an external force estimation unit which estimates external force generated by force applied to the robot from an outside of the robot by subtracting the internal force from output of the force detector. First upper limit values regarding the external force for stopping the robot when a person and an object has made contact with the robot, and a second upper limit value smaller than the first upper limit values have been set in advance. The stop command unit is formed to stop the robot when the external force estimated by the external force estimation unit during an operation period of the robot exceeds the first upper limit values set in advance, and makes the robot to be in the stop state when an average value of the external force in a time length decided in advance during the operation period or a stop period of the robot exceeds the second upper limit value.

In the aforementioned invention, the robot control device includes a mass parameter storage unit which stores a plurality of mass parameters, wherein after the robot stops together with switching of the mass parameter by the mass parameter setting unit and a change in a grasping state of the workpiece, when the average value of the external force estimated by the external force estimation unit in the time length decided in advance exceeds the second upper limit value, the stop command unit can maintain a stop state of the robot.

In the aforementioned invention, after the external force estimated by the external force estimation unit during the operation period of the robot exceeds the first upper limit values and the robot stops, when the average value of the external force in the time length decided in advance exceeds the second upper limit value or when a change width of the external force in the time length decided in advance exceeds a change width judgement value decided in advance, the stop command unit can maintain the stop state of the robot.

In the aforementioned invention, after the robot stops together with the switching of the mass parameter and the change in the grasping state of the workpiece, when a change width of the external force in the time length decided in advance exceeds a change width judgement value decided in advance, the stop command unit can maintain the stop state of the robot.

In the aforementioned invention, the first upper limit values can be set as a value obtained by subtracting the second upper limit value from contact force for stopping the robot when the person or the object has made contact with the robot.

BRIEF DESCRIPTION OF THE DRAWINGS

FIG. 8 is a flowchart of operation control in an embodiment.

DETAILED DESCRIPTION

Figure 1:
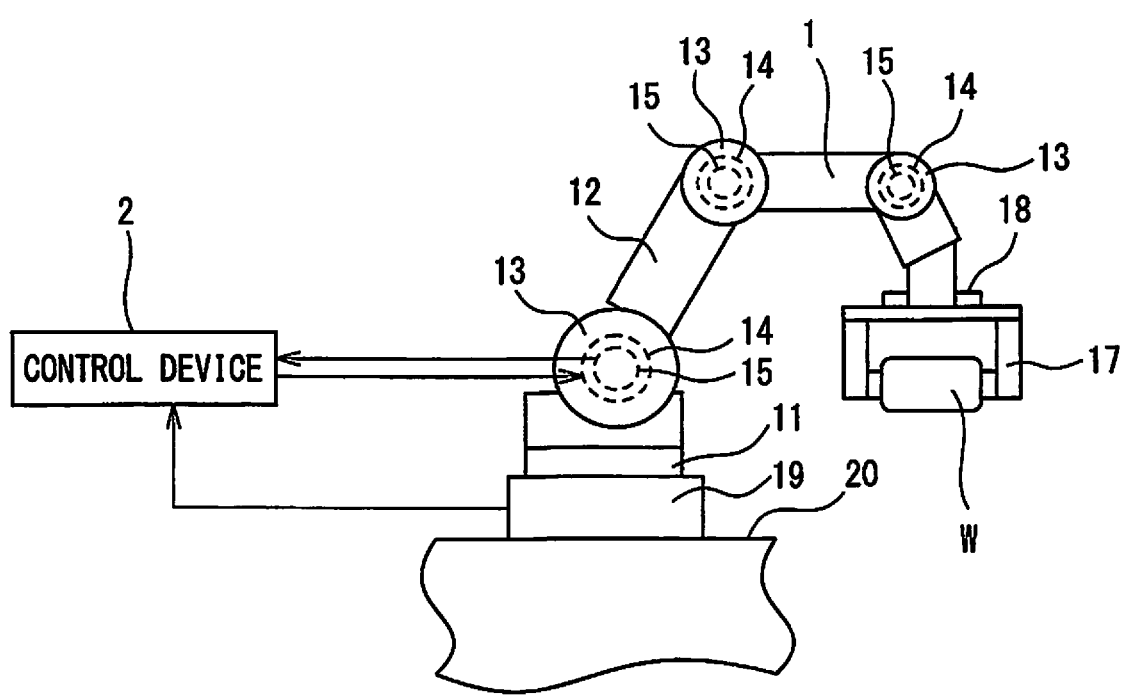
FIG. 1 is a schematic view of a robot system in an embodiment.

With reference to FIG. 1 to FIG. 8, a robot control device in an embodiment will be described. FIG. 1 is a schematic view of a robot system in the present embodiment. The robot system comprises a robot 1 which performs the conveyance of a workpiece W, and a control device 2 serving as a robot control device which controls the robot 1. The robot 1 of the present embodiment is an articulated robot. In the present invention, both an arm 12 and a hand 17 are called the robot 1. The hand 17 serves as a grasping unit which grasps or releases the workpiece W. The arm 12 supports the hand 17. The arm 12 of the present embodiment includes a plurality of joint parts 13.

The robot 1 includes an arm driving device which drives each joint part 13. The arm driving device includes an arm driving motor 14 arranged in the joint part 13. The arm driving motor 14 is driven, so that the arm 12 can be bent by the joint parts 13 at a desired angle.

The robot 1 includes a hand driving device which closes or opens the hand 17. The hand driving device of the present embodiment drives the hand 17 by air pressure. The hand driving device includes a hand driving cylinder 18 connected to the hand 17, and an air pump and an electromagnetic valve for supplying compressed air to the hand driving cylinder 18.

The robot 1 includes a base part 11 which supports the arm 12. The robot 1 in the present embodiment includes a force detector 19 which detects force and torque applied to the base part 11. The force applied to the base part 11 corresponds to force applied to the robot 1. The force detector 19 is arranged at a lower side of the base part 11. The force detector 19 is fixed to an installation surface 20.

The force detector 19 in the present embodiment includes a metallic base member connected to the base part 11 and strain sensors mounted on the surface of the base member. The strain sensors are arranges at a plurality of places on the surface of the base member. When force is applied to the base member in a predetermined direction, the base member is slightly strained. The strain sensor detects a deformation amount of the base member at a predetermined position. On the basis of the deformation amount detected by the strain sensor, the force detector 19 calculates force or torque applied to the base member, i.e., the force or the torque applied to the robot 1.

As the force applied to the robot 1, linear force applied in a predetermined direction can be exemplified. For example, the force applied to the robot 1 includes vertical downward force applied by the mass of the robot 1 and the mass of the workpiece W. Furthermore, as the torque applied to the robot 1, torque in a predetermined rotation direction can be exemplified. For example, when the arm 12 rotates around a rotating shaft extending in a vertical direction, the torque applied to the robot 1 includes torque in a direction around the rotating shaft. The force detector 19 in the present embodiment is formed to be able to detect both the force and the torque applied to the robot 1.

The robot 1 in the present embodiment includes a state detector which detects a position and a posture of a robot. The state detector detects the position of a reference point of the arm 12, a folded state of the arm 12 in the joint part 13, a direction in which the arm 12 is directed, and the like. The state detector in the present embodiment includes a rotation angle detector 15 mounted in each arm driving motor 14. The rotation angle detector 15 detects a rotation angle when the arm driving motor 14 is driven. On the basis of the rotation angle of each arm driving motor 14, it is possible to detect angles in the joint parts 13 of the arm 12.

Furthermore, the robot 1 of the present embodiment is formed so that the entire arm 12 can rotate around the rotating shaft extending in the vertical direction. The arm driving device includes a driving motor for rotating the arm 12. The state detector includes a rotation angle detector which detects a rotation angle of the arm 12 with respect to the base part 11. On the basis of the detected rotation angle, it is possible to detect a direction in which the arm 12 extends.

The robot 1 is driven on the basis of an operation command of the control device 2. The arm driving device and the hand driving device are controlled by the control device 2. For example, the rotation angle of the arm driving motor 14 and the air pressure of the hand driving cylinder 18 are controlled by the control device 2. Furthermore, the output of the state detector is input to the control device 2.

Figure 2:
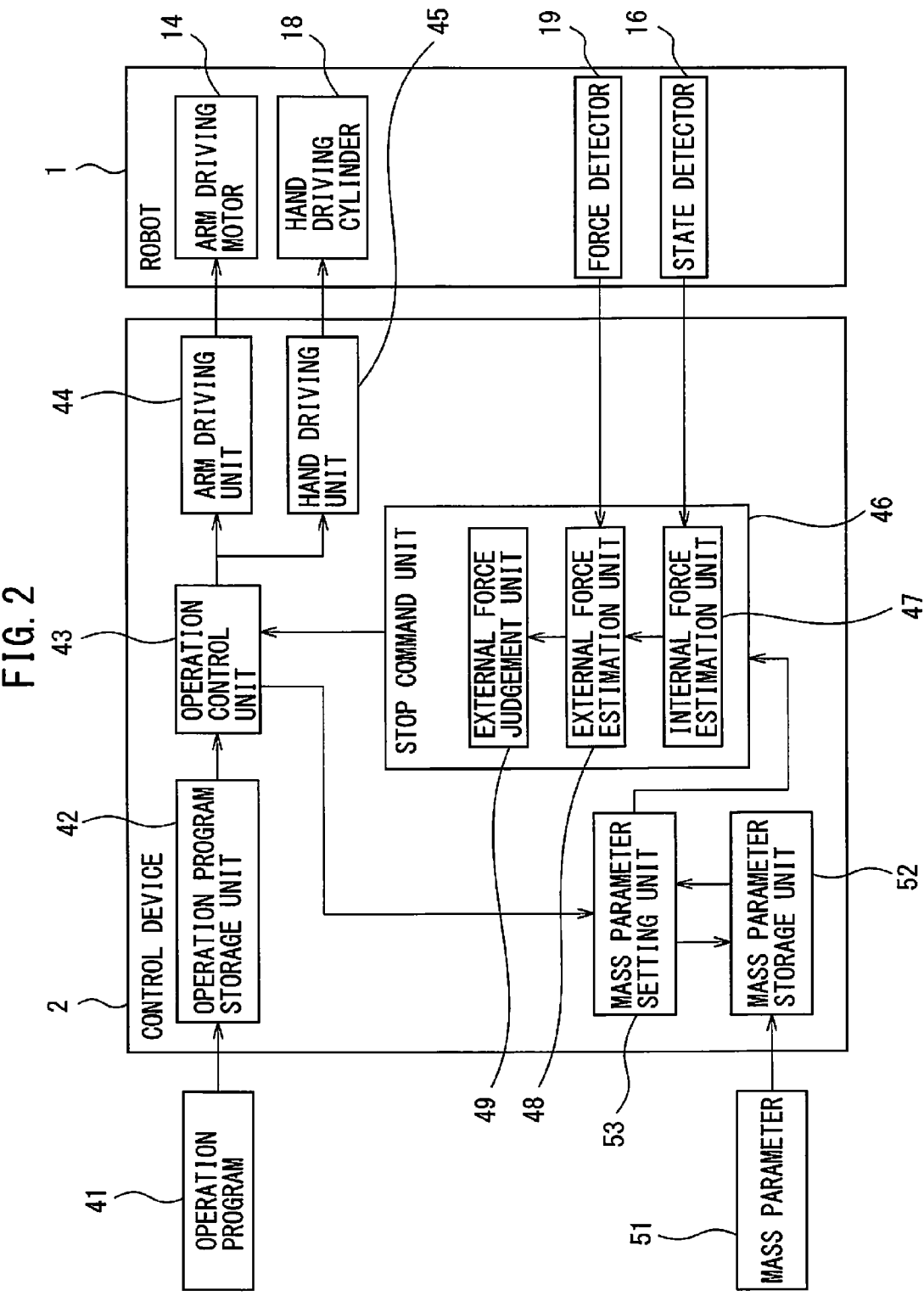
FIG. 2 is a block diagram of a robot system in an embodiment.

FIG. 2 illustrates a block diagram of the robot system in the present embodiment. In the present embodiment, control for conveying a workpiece on the basis of an operation program 41 will be described as an example. The robot 1 can automatically convey the workpiece from an initial position to a target position. The control device 2 includes a digital computer having CPU (Central Processing Unit), RAM (Random Access Memory), and ROM (Read Only Memory) connected to one another via a bus.

The control device 2 receives the operation program 41 created in advance in order to perform the operation of the robot 1. The operation program 41 is stored in an operation program storage unit 42. An operation control unit 43 sends an operation command for driving the robot 1 on the basis of the operation program. The operation control unit 43 sends an operation command for driving the arm driving device to an arm driving unit 44. The arm driving unit 44 includes an electrical circuit which drives the arm driving motor 14 and the like, and supplies power to the arm driving motor 14 and the like on the basis of the operation command. The arm driving motor 14 is driven, so that the folded angle of the arm 12, the direction of the arm 12 and the like are adjusted.

Furthermore, the operation control unit 43 sends an operation command for driving the hand driving device to a hand driving unit 45. The hand driving unit 45 includes an electrical circuit which drives the air pump and the like, and compressed air is supplied to the hand driving cylinder 18 on the basis of the operation command. The compressed air supplied to the hand driving cylinder 18 is adjusted, so that the hand 17 is opened and closed. The hand 17 is opened and closed, so that it is possible to grasp or release the workpiece W.

The control device 2 of the present embodiment receives a mass parameter 51. The mass parameter 51 is stored in a mass parameter storage unit 52 of the control device 2. In addition, a storage device having the function of the operation program storage unit 42 and the function of the mass parameter storage unit 52 may also be arranged in the control device.

The mass parameter 51 includes information regarding the mass of each part of the robot 1 and the mass of the workpiece W in order to estimate internal force applied to the robot 1. The mass parameter 51, for example, includes information of the mass of each part of the robot 1 and the center of mass (center of Gravity) regarding each part. Furthermore, the mass parameter 51 can include an inertia matrix used when the inertia moment in each coordinate axis of the robot 1 is calculated.

The control device 2 includes a mass parameter setting unit 53. The mass parameter setting unit 53 sets a mass parameter on the basis of a command from the operation control unit 43. In the present embodiment, the mass parameter is set for each type of the workpiece W. The mass parameter setting unit 53 changes the mass parameter whenever the type of a workpiece is changed. Furthermore, the mass parameter setting unit 53 changes the mass parameter in the state in which the hand 17 has grasped the workpiece W and the state in which the hand 17 has released the workpiece W.

The control device 2 of the present embodiment includes a stop command unit 46 which sends a command for making the robot 1 to be in a stop state to the operation control unit 43. Even in any one state of a period in which the robot 1 operates and a period in which the robot 1 stops, the stop command unit 46 is formed to be able to send a command for stopping an operation. When a stop command has been sent while the robot 1 is stopping, the stop state of the robot 1 is maintained.

The mass parameter setting unit 53 sends the set mass parameter to the stop command unit 46. The stop command unit 46 includes an internal force estimation unit 47 which estimates internal force generated by the mass of the robot 1 and the operation of the robot. In the state in which no force has been applied to the robot 1 from an exterior, the internal force estimation unit 47 calculates force applied to the robot 1 by its own weight when the robot 1 has operated. The internal force can be calculated on the basis of the position and the posture of the robot detected by a state detector 16 and the mass parameter 51. The internal force estimation unit 47 is formed to be able to calculate both force in a linear direction and torque in a rotation direction applied to the robot 1.

The stop command unit 46 includes an external force estimation unit 48 which estimates external force generated by force applied to the robot 1 from an outside of the robot 1. The external force estimation unit 48 calculates external force by subtracting the internal force estimated by the internal force estimation unit 47 from the output of the force detector 19. The force detector 19 of the present embodiment is formed to be able to detect both force and torque. The external force estimation unit 48 of the present embodiment is formed to be able to calculate both the force and the torque applied to the robot 1 as external force.

The stop command unit 46 includes an external force judgement unit 49 which judges the calculated external force. The external force judgement unit 49 determines whether the calculated external force coincides with a predetermined condition or not. When the external force satisfies the predetermined condition, the stop command unit 46 sends the stop command of the robot 1 to the operation control unit 43.

Figure 3:
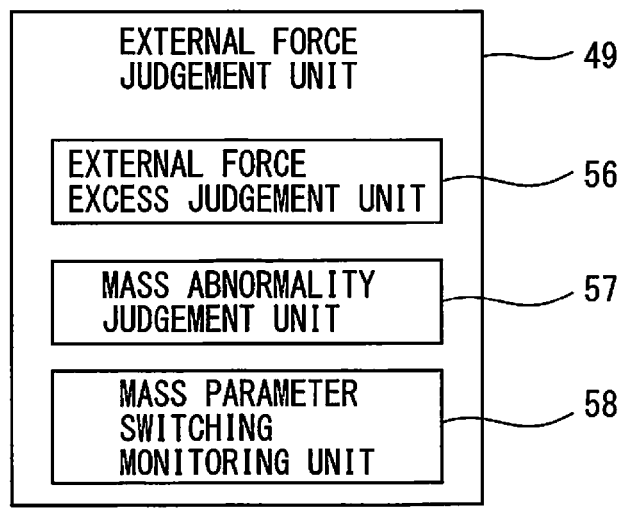
FIG. 3 is a block diagram of an external force judgement unit of a control device in an embodiment.

FIG. 3 shows a block diagram of the external force judgement unit in the present embodiment. The external force judgement unit 49 includes an external force excess judgement unit 56. The external force excess judgement unit 56 determines whether or not the external force estimated by the external force estimation unit 48 exceeds a first upper limit value decided in advance. When the estimated external force exceeds the first upper limit value, it can be judged that the robot 1 is pushed by force larger than permitted force. Then, the stop command unit 46 sends the stop command of the robot 1 to the operation control unit 43. The operation control unit 43 stops the execution of the operation program, thereby making the robot 1 to be in a stop state. The first upper limit value has been decided in advance. The first upper limit value, for example, can employ a value smaller than contact force permitted when a person or an object has made contact with the robot.

As described above, during a period in which the robot operates, when a person or an object has made contact with the robot 1, the robot 1 automatically stops.

The external force excess judgement unit 56 of the present embodiment performs judgement by the force among the force and the torque of the external force. The external force excess judgement unit 56 performs the judgement by using resultant force of force in directions of each coordinate axis. The judgement of the external force is not limited thereto, and may also be performed on the basis of the torque. Furthermore, both the force and the torque may also be used. For example, when at least one of the force and the torque exceeds each upper limit value, it is possible to stop the robot. Also in the following control, it is possible to perform judgement by using at least one of the force and the torque in a similar manner.

Figure 4:
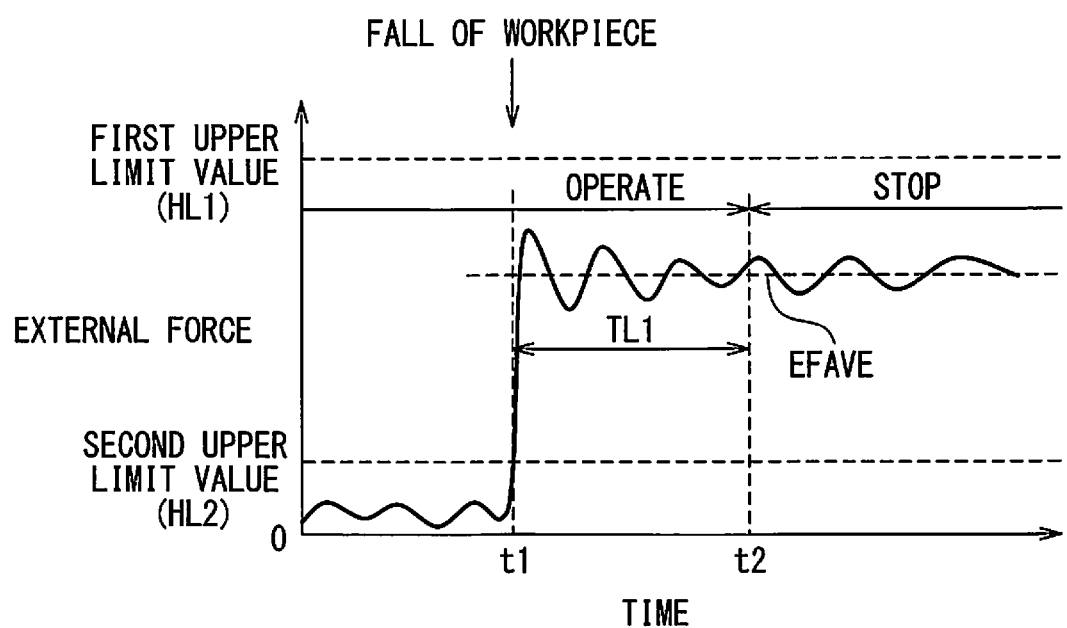
FIG. 4 is a time chart of first operation control in an embodiment.

FIG. 4 illustrates a time chart of first operation control in the present embodiment. In the first operation control, it is possible to determine whether the mass of a workpiece actually grasped by the hand 17 coincides with the mass of a workpiece of the mass parameter or not. FIG. 4 illustrates control when the workpiece W is separated from the hand 17 and falls during a period in which the workpiece W is conveyed. A first upper limit value HL1 is a judgement value for judging that a person or an object has made contact as described above.

A vertical axis denotes the magnitude of the external force calculated by the external force estimation unit 48. For example, external force obtained by combining force in a plurality of directions with one another is directed in a predetermined direction. Furthermore, when a coordinate axis has been set, there is a case in which the direction of external force is not a positive direction but a negative direction. Hereinafter, the judgement is performed by the magnitude of external force without considering the direction of the external force.

With reference to FIG. 3 and FIG. 4, the external force judgement unit 49 includes a mass abnormality judgement unit 57 which determines whether the mass of a workpiece W actually grasped by the hand 17 coincides with the mass of a workpiece W included in the mass parameter or not.

In the control device 2 of the present embodiment, in addition to the first upper limit value HL1, a second upper limit value HL2 has been set in advance. The second upper limit value HL2 is a judgement value for detecting the abnormality of the mass of the workpiece W. The second upper limit value can be included in the mass parameter 51. The second upper limit value HL2 is a judgement value smaller than the first upper limit value HL1. Furthermore, the second upper limit value can be set on the basis of the mass of the workpiece W. In the present embodiment, the second upper limit value HL2 is set to be smaller than external force corresponding to the mass of the workpiece W.

In the example illustrated in FIG. 4, up to a time t1, the robot 1 conveys the workpiece W in a normal state. The internal force estimation unit 47 estimates internal force and the external force estimation unit 48 estimates external force at each time interval decided in advance. Due to vibration and the like by the operation of the robot 1, slight external force is detected. The external force maintains a value of almost 0 while causing small vibration.

At the time t1, the workpiece W falls from the hand 17. When the workpiece W has fallen from the hand 17, the actual mass of the workpiece W grasped by the hand 17 becomes zero. The total mass of the hand 17 and the workpiece W included in the mass parameter 51 becomes different from the actual total mass of the hand 17 and the workpiece W. The internal force estimation unit 47 estimates internal force under the condition that the robot 1 has grasped the workpiece W. However, since robot 1 does not actually grasp the workpiece W, it is similar to the state in which the robot 1 has been pushed from a lower side by force corresponding to the mass of the workpiece W.

At the time t1, the external force increases. The increase in the external force at this time is equal to or less than the first upper limit value HL1. Therefore, immediately after the time t1, the robot 1 continues to operate.

The mass abnormality judgement unit 57 of the external force judgement unit 49 calculates an average value in a time length TL1 at each time interval decided in advance. The time length TL1 has been decided in advance, and for example, can employ one second. When the average value in the time length TL1 decided in advance exceeds the second upper limit value HL2, the robot 1 is stopped.

At a time t2, the mass abnormality judgement unit 57 detects that an average value EFAVE of the external force in the time length TL1 has exceeded the second upper limit value HL2. The stop command unit 46 outputs a stop command to the operation control unit 43. Even after the time t2, the judgement of the mass abnormality judgement unit 57 and the sending of the stop command by the stop command unit 46 are performed. Therefore, after the time t2, the stop state of the robot 1 is maintained.

As described above, even when the external force does not reach the first upper limit value HL1, the control device 2 can detect that the mass of the workpiece W has changed, and stop the robot 1. In the present embodiment, for the judgement of a change in the mass, the average value EFAVE of the time length TL1 decided in advance is employed. Since the external force vibrates with the operation of the robot 1, there is a case in which the external force temporarily exceeds the second upper limit value HL2. In the first operation control, the average value of the external force in the time length TL1 is used, so that it is possible to perform judgement by external force constantly applied to the robot 1. It is possible to accurately detect that the mass of an object grasped by the hand 17 has changed. Therefore, it is possible to prevent the robot from stopping because the second upper limit value is exceeded by a temporary change in the external force.

Particularly, in the state in which the workpiece W has fallen, there is a case in which a worker makes contact with an upper surface of the arm 12 during a period in which the arm 12 rises. In this case, contact force directed downward is applied to the arm 12. Meanwhile, the internal force estimation unit 47 estimates internal force under the condition that the workpiece W has been grasped. Therefore, until the external force reaches a value obtained by adding force corresponding to the mass of the workpiece W to the first upper limit value, the robot does not stop. As a consequence, there is a problem that large force is applied to a worker.

In the first operation control, it is possible to quickly detect the falling of a workpiece, so that it is possible to prevent large force from being applied to a worker. The first operation control can also be performed during a stop period of the robot 1 in addition to an operation period of the robot 1. Furthermore, stopping the robot 1 is not limited to the case where the workpiece W falls, and it is possible to stop the robot when the mass of a workpiece stored in the mass parameter is different from the actual mass of a workpiece. For example, when there is an error in the input of the mass parameter, a workpiece different from a desired workpiece is conveyed, and the like, it is possible to stop the robot.

Figure 5:
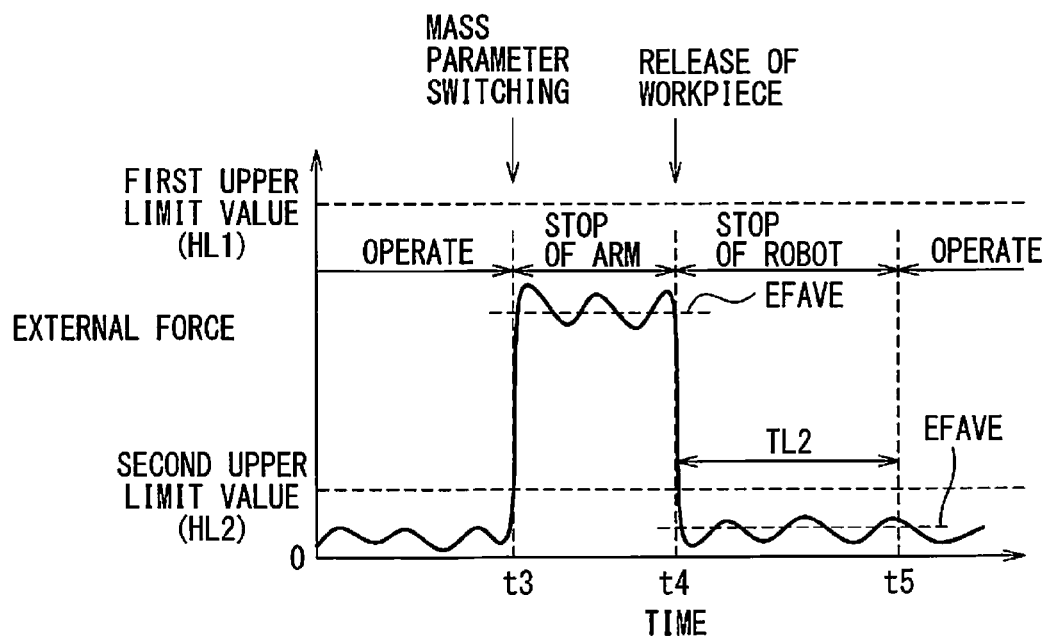
FIG. 5 is a time chart of second operation control in an embodiment.

FIG. 5 illustrates a time chart of second operation control in the present embodiment. In the second operation control, control when the conveyance of the workpiece W is ended and the workpiece W is separated from the hand 17 is illustrated. Referring to FIG. 3, the external force judgement unit 49 includes a mass parameter switching monitoring unit 58. The mass parameter switching monitoring unit 58 performs judgement of external force when a mass parameter is switched.

Referring to FIG. 2, when the workpiece W is released, the mass parameter setting unit 53 switches the mass parameter by a command from the operation control unit 43. In other words, the mass parameter setting unit 53 switches a mass parameter in a state in which the workpiece W has been grasped to a mass parameter in a state in which the workpiece W has not been grasped.

Referring to FIG. 5, up to a time t3, the robot 1 operates to convey the workpiece W to a target position. A mass parameter at this time employs the mass parameter in the state in which a workpiece has been grasped. At the time t3, the workpiece W reaches the target position.

At the time t3, the stop command unit 46 sends a stop command of the operation of the arm 12, thereby stopping the operation of the arm 12. The mass parameter setting unit 53 switches the mass parameter to the mass parameter 51 in the state in which the workpiece W has not been grasped. Since the hand 17 does not actually release the workpiece W, external force is detected. For example, the mass parameter 51 is switched and the internal force estimated by the internal force estimation unit 47 becomes small, so that external force becomes large.

At a time t4, the hand 17 releases the workpiece W. The workpiece W is released and the total mass of the workpiece and the hand included in the mass parameter and the actual total mass of the workpiece and the hand coincide with each other, so that the external force estimation unit 48 estimates accurate external force. The external force is equal to or less than the second upper limit value HL2.

The external force estimation unit 48 estimates the external force at each time interval decided in advance. The mass parameter switching monitoring unit 58 of the external force judgement unit 49 calculates the average value EFAVE of the external force. At this time, the mass parameter switching monitoring unit 58 calculates the average value of the external force in a time length TL2 decided in advance. Then, the mass parameter switching monitoring unit 58 determines whether the average value EFAVE of the external force is larger than the second upper limit value HL2 or not. When the average value EFAVE of the external force is larger than the second upper limit value HL2, the stop command unit 46 outputs a stop command to the operation control unit 43. In other words, the stop of the robot 1 is maintained until the average value EFAVE of the external force becomes equal to or less than the second upper limit value HL2. When the average value EFAVE of the external force has become equal to or less than the second upper limit value HL2, it can be judged that the mass parameter coincides with the actual state. In this case, the stop command unit 46 outputs a command for releasing the stop command to the operation control unit 43.

In the example illustrated in FIG. 5, at a time t5, the average value EFAVE of the external force in the time length TL2 decided in advance becomes equal to or less than the second upper limit value HL2. Therefore, after the time t5, the robot 1 restarts an operation.

When the grasping state of the workpiece W by the hand 17 is changed, it is necessary to switch the mass parameter. When the grasping state of a workpiece has been changed, there is a case in which the mass of a workpiece stored in the mass parameter is different from the actual mass of a workpiece due to an error and the like of a worker. In the state in which the mass parameter is different from the actual state, when the driving of the robot 1 is restarted, there is a case in which large contact force is applied when the worker has made contact. Although the robot 1 is received the contact force for stop, there occurs a case in which the robot 1 does not stop.

In the second operation control, the robot 1 is stopped until the average value EFAVE of the external force becomes equal to or less than the second upper limit value HL2. In other words, the robot 1 is stopped until it is confirmed that the mass parameter coincides with the actual state. Therefore, when the driving of the robot 1 has been restarted, the mass parameter coincides with the actual state. After the driving of the robot 1 is restarted, even though a worker has made contact with the robot, it is possible to avoid large contact force.

In the present embodiment, the example in which the grasping state of a workpiece by the hand is changed to the separation state of the workpiece has been described, however, the present invention is not limited thereto. It is possible to perform similar control when the grasping state of the workpiece is changed. For example, even when the separation state of the workpiece is changed to the grasping state of the workpiece, it is possible to perform similar control. Furthermore, the second operation control is preferable when the type of the workpiece has been changed.

In addition, in the state in which the robot has stopped, control for maintaining the stop of the robot 1 until the average value EFAVE of the external force becomes equal to or less than the second upper limit value HL2 can be performed when the robot has entered a stop state in arbitrary conditions, regardless of the aforementioned control. For example, the control can be performed in a period after external force exceeds the first upper limit value and then the robot has stopped.

Figure 6:
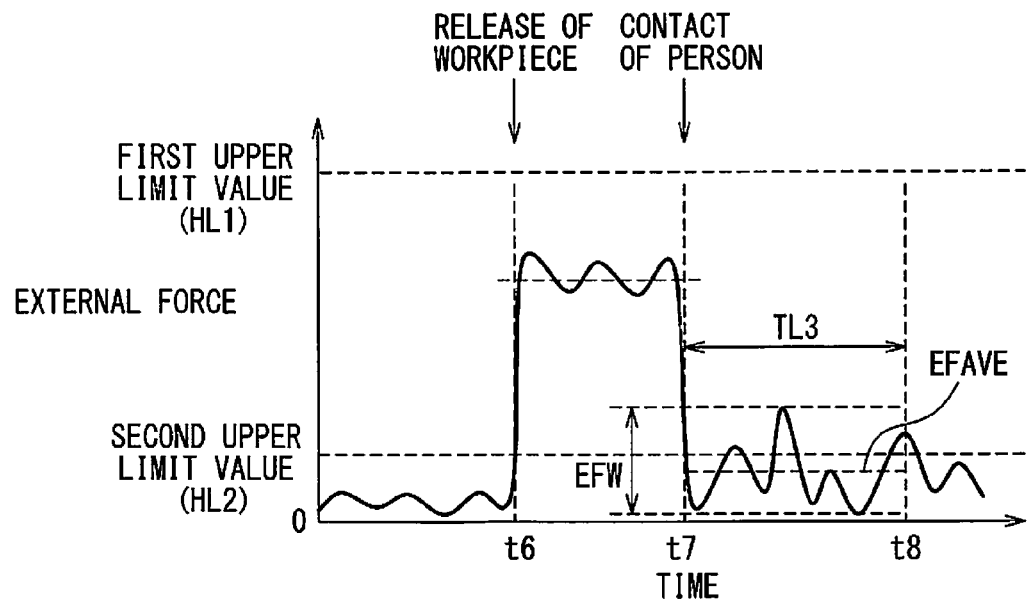
FIG. 6 is a time chart of third operation control in an embodiment.

FIG. 6 illustrates a time chart of third operation control of the present embodiment. The third operation control is control when a worker has made contact with the robot during a period in which the robot stops. Hereinafter, an example in which a worker manually operates the robot 1 will be described as an example.

Up to a time t6, the robot 1 conveys the workpiece W. At the time t6, the workpiece W reaches a target position. At the time t6, the hand 17 releases the workpiece W. The worker should change the mass parameter together with the release of the workpiece W, however, a case in which the mass parameter is not changed will be described below. At the time t6, external force corresponding to the mass of the workpiece W is calculated.

In this example, the first operation control is performed. The external force judgement unit 49 calculates an average value of external force in a time length decided in advance. In a period from the time t6 to a time t7, the external force becomes larger than the second upper limit value HL2. Therefore, the stop command unit 46 should send a stop command and a stop state of the robot 1 should be continued.

However, at the time t7, the worker makes contact with the robot 1. In this embodiment, the worker makes contact with the robot 1 while pushing the robot 1 downward. When contact force at this time is approximate to force corresponding to the mass of the workpiece, there is a case in which the calculated external force becomes small and the average value EFAVE of the external force in the time length decided in advance becomes equal to or less than the second upper limit value HL2. Therefore, there is a case in which the robot operates again although the works is making contact with the robot. Alternatively, although a selected mass parameter is erroneous, there is a case in which the robot is driven again. As a consequence, when the worker has made contact with the robot, large force may be applied to the worker.

When a person is making contact with the robot, it is difficult to continuously apply constant contact force to the robot 1. Therefore, contact force changes according to the passage of time. A change amount of the output of the force detector 19 becomes large. Furthermore, a change amount of the estimated external force becomes large. In this regard, in the third operation control, the external force judgement unit 49 calculates a change width EFW of the external force in a time length TL3 decided in advance. The change width EFW employs a difference between a maximum value and a minimum value of force in the period of the time length TL3. The external force judgement unit 49 determines whether or not the change width EFW is smaller than a change width judgement value decided in advance. When the change width EFW is equal to or more than the change width judgement value decided in advance, it can be judged that a person is making contact with the robot. In this case, the stop command unit 46 sends the stop command of the robot 1 to the operation control unit 43. On the other hand, when the change width EFW has become smaller than the change width judgement value decided in advance, the stop command unit 46 releases the stop command of the robot.

As described above, in the third operation control, control for stopping the robot is performed until the change width EFW becomes smaller than the change width judgement value decided in advance. As a consequence, even when a person makes contact with the robot 1 and the average value of the external force becomes equal to or less than the second upper limit value, it is possible to prevent the robot from being driven again.

In addition, as the change width of the external force, it is possible to employ an arbitrary value for estimating a change amount of the external force as well as a difference between a maximum value and a minimum value of the external force in a period decided in advance. For example, dispersion of the external force calculated at each time interval decided in advance is calculated. When the calculated dispersion of the external force is equal to or more than the change width judgement value decided in advance, it is possible to maintain the stop of the robot.

The third operation control is not limited to the control when the workpiece has been released, and can be performed in an arbitrary state in which the robot is stopping. For example, the third operation control can be performed when a change in the mass of the workpiece is detected and the robot has stopped in the second operation control. Furthermore, in the aforementioned control, after the robot 1 is stopped, the first operation control and the third operation control are performed; however, the present invention is not limited thereto. The judgement control by the change width of the external force of the third operation control may also be performed without performing the judgement control by the average value of the external force of the first operation control.

Figure 7:
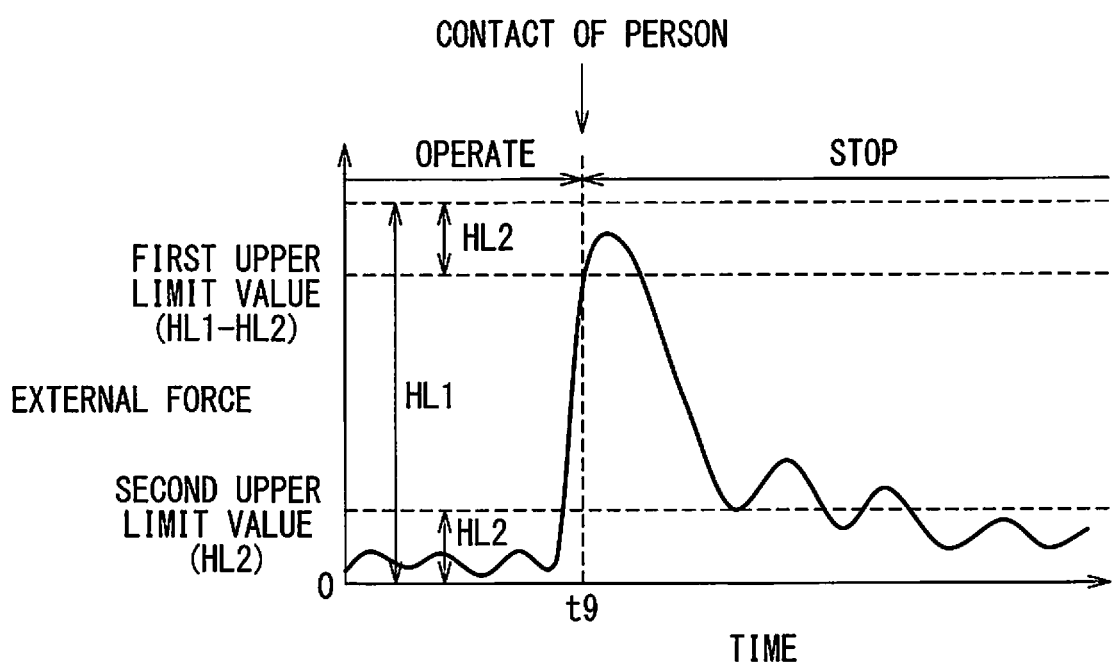
FIG. 7 is a time chart of fourth operation control in an embodiment.

FIG. 7 illustrates a time chart of fourth operation control in the present embodiment. In a change and the like in the mass parameter, there is a case in which a small difference not detected in the second upper limit value exists between the mass of the workpiece included in the mass parameter and the actual mass of the workpiece. In this case, the stop command of the robot 1 is not sent and the robot 1 continues to operate. In other words, there is a case in which the robot operates in the state in which a difference smaller than a mass difference corresponding to the second upper limit value exists between the mass of the workpiece of the mass parameter and the actual mass of the workpiece.

In this state, for example, when a worker has made contact with the arm 12 while the arm 12 is operating, although contact force is larger than force for stopping the robot 1, which corresponds to the first upper limit value HL1, there is a case in which calculated external force becomes equal to or less than the first upper limit value HL1. In other words, there is a case in which force corresponding to a mass difference between the mass of the workpiece of the mass parameter and the actual mass of the workpiece is subtracted from the external force.

In the first operation control, the first upper limit value has been set so that contact force when a person has made contact with the robot does not become larger than permitted force. In the fourth operation control, a value (HL1−HL2) obtained by subtracting the second upper limit value HL2 from the first upper limit value HL1 in the first operation control is set as the first upper limit value. The first upper limit value of the fourth operation control has been set as a value obtained by subtracting the second upper limit value from the permitted force when a person has made contact with the robot. In other words, the first upper limit value has been set as a value obtained by subtracting the second upper limit value from contact force for stopping the robot when a person or an object has made contact with the robot. Also in fourth operation control, control when the external force estimated by the external force estimation unit 48 has exceeded the first upper limit value (HL1−HL2) is similar to that of the first operation control.

In the example illustrated in FIG. 7, during a period in which the robot 1 conveys the workpiece W, a worker makes contact with the robot 1 at a time t9. At the time t9, external force increases and becomes larger than the first upper limit value (HL1−HL2). The stop command unit 46 outputs the stop command of the robot to the operation control unit 43. In this manner, the estimated external force does not reach the first upper limit value HL1 of the first operation control, but it is possible to stop the robot 1.

In the fourth operation control, even though there is a mass difference between the mass of the workpiece included in the mass parameter and the actual mass of the workpiece, it is possible to prevent a worker from receiving contact force larger than the permitted contact force. The first upper limit value of the fourth operation control as described above can be employed when arbitrary operation control is performed.

FIG. 8 illustrates a flowchart of operation control in the present embodiment. The operation control includes the aforementioned first operation control to fourth operation control.

Referring to FIG. 2, FIG. 3, and FIG. 8, in step 71, the internal force estimation unit 47 estimates internal force. In step 72, the external force estimation unit 48 estimates external force on the basis of the calculated internal force and the output of the force detector 19.

In step 73, it is determined whether or not the stop command unit 46 sends a stop command of the robot 1 or the arm 12. In step 73, when the stop command unit 46 sends the stop command, the procedure proceeds to step 84. In step 73, when the stop command unit 46 does not send the stop command, the procedure proceeds to step 74.

In step 74, it is determined whether the mass parameter setting unit 53 has changed the mass parameter or not. In addition, in step 74, it may also be judged whether a workpiece has been grasped or released. In step 74, when the mass parameter has not been changed, the procedure proceeds to step 75.

On the other hand, when the mass parameter has been changed in step 74, the procedure proceeds to step 81. In step 81, the stop command unit 46 outputs the stop command of the robot to the operation control unit 43. The operation control unit 43 stops the execution of the operation program. When the robot 1 operates on the basis of the operation program, the operation control unit 43 stops the robot 1.

In step 75, the external force judgement unit 49 determines whether the estimated external force exceeds a first upper limit value or not. As the first upper limit value of this control example, the first upper limit value (HL1−HL2) in the fourth operation control is employed. The first upper limit value is not limited thereto, and the first upper limit value HL1 employed in the first operation control may also be used. In step 75, when the external force is larger than the first upper limit value, the procedure proceeds to step 81. In step 75, when the external force is equal to or less than the first upper limit value, the procedure proceeds to step 76.

In step 76, the external force judgement unit 49 determines whether an average value of the external force in a time length decided in advance exceeds the second upper limit value or not. When the average value of the external force is equal to or less than the second upper limit value, this control is ended. The stop command unit 46 outputs no stop command, and this control is ended. As a consequence, the operation control unit 43 continues the control of the robot 1 based on the operation program 41. In step 76, when the average value of the external force is larger than the second upper limit value, the procedure proceeds to step 81.

Next, in step 84, the external force judgement unit 49 determines whether or not a change width of the external force in the time length decided in advance is smaller than a change width judgement value decided in advance. In other words, it is judged if the change width of the external force is small. When the change width of the external force is equal to or more than the change width judgement value, it can be judged that a person makes contact, for example. In this case, the procedure proceeds to step 81 and the stop state of the robot 1 is maintained. In step 84, when the change width of the external force is smaller than the change width judgement value, it can be judged that a person does not make contact, for example. In this case, the procedure proceeds to step 85.

In step 85, the external force judgement unit 49 determines whether the average value of the external force in the time length decided in advance is larger than the second upper limit value or not. When the average value of the external force is larger than the second upper limit value, it can be judged that the workpiece has fallen, the selection of the mass parameter has been erroneous, or the type of the workpiece has been erroneous. In this case, the procedure proceeds to step 81 and the stop state of the robot 1 is maintained.

In step 85, when the average value of the external force is equal to or less than the second upper limit value, the procedure proceeds to step 86. In this case, it can be judged that a problem, by which the robot 1 has stopped, has been solved. For example, it can be judged that the mass parameter coincides with the actual state of the robot 1 and a person does not make contact with the robot 1.

In step 86, the stop command of the robot 1 is released. The stop command unit 46 outputs the release of the stop command of the robot to the operation control unit 43. The operation control unit 43 operates or stops the robot 1 on the basis of the operation program 41.

The force detector in the present embodiment is formed to be able to detect both force and torque applied to the robot. However, the present invention is not limited thereto, and it is sufficient if the force detector is formed to be able to detect at least one of the force and the torque. When one of the force and the torque is detected, it is possible to perform judgement of external force on the basis of the detected variable.

In the present embodiment, the articulated robot has been described as an example. However, the present invention is not limited thereto and can be applied to an arbitrary robot control device. Furthermore, the grasping unit for grasping the workpiece of the present embodiment is configured by a hand which opens and closes claw parts facing each other. However, the present invention is not limited thereto and the grasping unit can employ an arbitrary structure. For example, the grasping unit may also grasp or release the workpiece by magnetic force. Furthermore, the hand driving device of the present embodiment grasps or opens the workpiece by air pressure. However, the present invention is not limited thereto and the hand driving device can employ an arbitrary device capable of driving the hand. For example, the hand driving device may also be formed to drive the hand by magnetic force of an electromagnet.

The aforementioned each operation control can be applied when the robot automatically operates on the basis of the operation program and when a worker manually activates the robot by operating an operating panel.

According to the present invention, it is possible to provide a robot control device which stops a robot when the mass of a workpiece grasped by the grasping unit is different from a desired mass of a workpiece.

In the aforementioned each control, it is possible to appropriately change an order of steps in the range in which functions and operations are not changed. The aforementioned embodiments can be appropriately combined with one another. In the aforementioned respective drawings, the same reference numerals are used to designate the same or equivalent parts. In addition, the aforementioned embodiments are for illustrative purposes only and are not intended to limit the present invention. Furthermore, the embodiments include modifications of embodiments in the appended claims.

The invention claimed is:

1. A robot control device which controls a robot including a force detector for detecting at least one of force and torque applied to the robot and a state detector for detecting a position and a posture of the robot, comprising:
   a mass parameter setting unit which sets a mass parameter including mass of the robot and mass of a workpiece; and
   a stop command unit which sends a command for making the robot to be in a stop state; wherein
   the stop command unit includes an internal force estimation unit which estimates internal force generated by an operation of the robot on a basis of the position and the posture of the robot detected by the state detector and the mass parameter, and an external force estimation unit which estimates external force generated by force applied to the robot from an outside of the robot by subtracting the internal force from output of the force detector,
   a first upper limit values regarding the external force for stopping the robot when a person and an object has made contact with the robot and a second upper limit value smaller than the first upper limit values have been set in advance, and
   the stop command unit is formed to stop the robot when the external force estimated by the external force estimation unit during an operation period of the robot exceeds the first upper limit values set in advance, and makes the robot to be in the stop state when an average value of the external force in a time length decided in advance during the operation period or a stop period of the robot exceeds the second upper limit value.

2. The robot control device according to claim 1, further comprising a mass parameter storage unit which stores a plurality of mass parameters, wherein
   after the robot stops together with switching of the mass parameter by the mass parameter setting unit and a change in a grasping state of the workpiece, when the average value of the external force estimated by the external force estimation unit in the time length decided in advance exceeds the second upper limit value, the stop command unit maintains a stop state of the robot.

3. The robot control device according to claim 1, wherein after the external force estimated by the external force estimation unit during the operation period of the robot exceeds the first upper limit values and the robot stops, when an average value of the external force in the time length decided in advance exceeds the second upper limit value or when a change width of the external force in the time length decided in advance exceeds a change width judgement value decided in advance, the stop command unit maintains the stop state of the robot.

4. The robot control device according to claim 2, wherein after the robot stops together with a switching of the mass parameter and a change in the grasping state of the workpiece, when a change width of the external force in the time length decided in advance exceeds a change width judgement value decided in advance, the stop command unit maintains the stop state of the robot.

5. The robot control device according to claim 1, wherein the first upper limit values are set as a value obtained by subtracting the second upper limit value from contact force for stopping the robot when a person or an object has made contact with the robot.

* * * * *